Dec. 16, 1947.  E. V. BERGSTROM ET AL  2,432,503
HEATER
Filed March 27, 1946  3 Sheets-Sheet 2
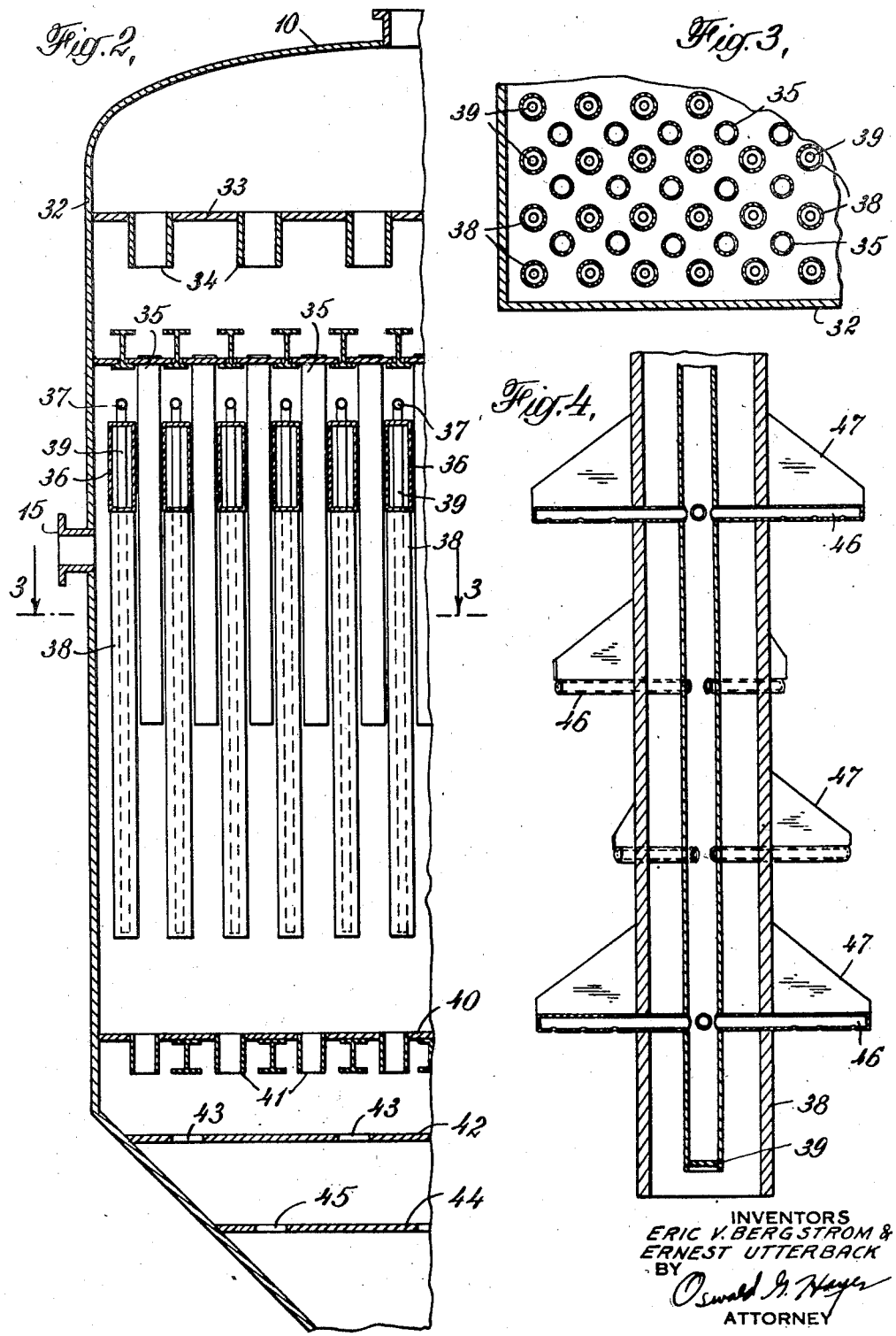
INVENTORS
ERIC V. BERGSTROM &
ERNEST UTTERBACK
BY
Oswald G. Hayes
ATTORNEY

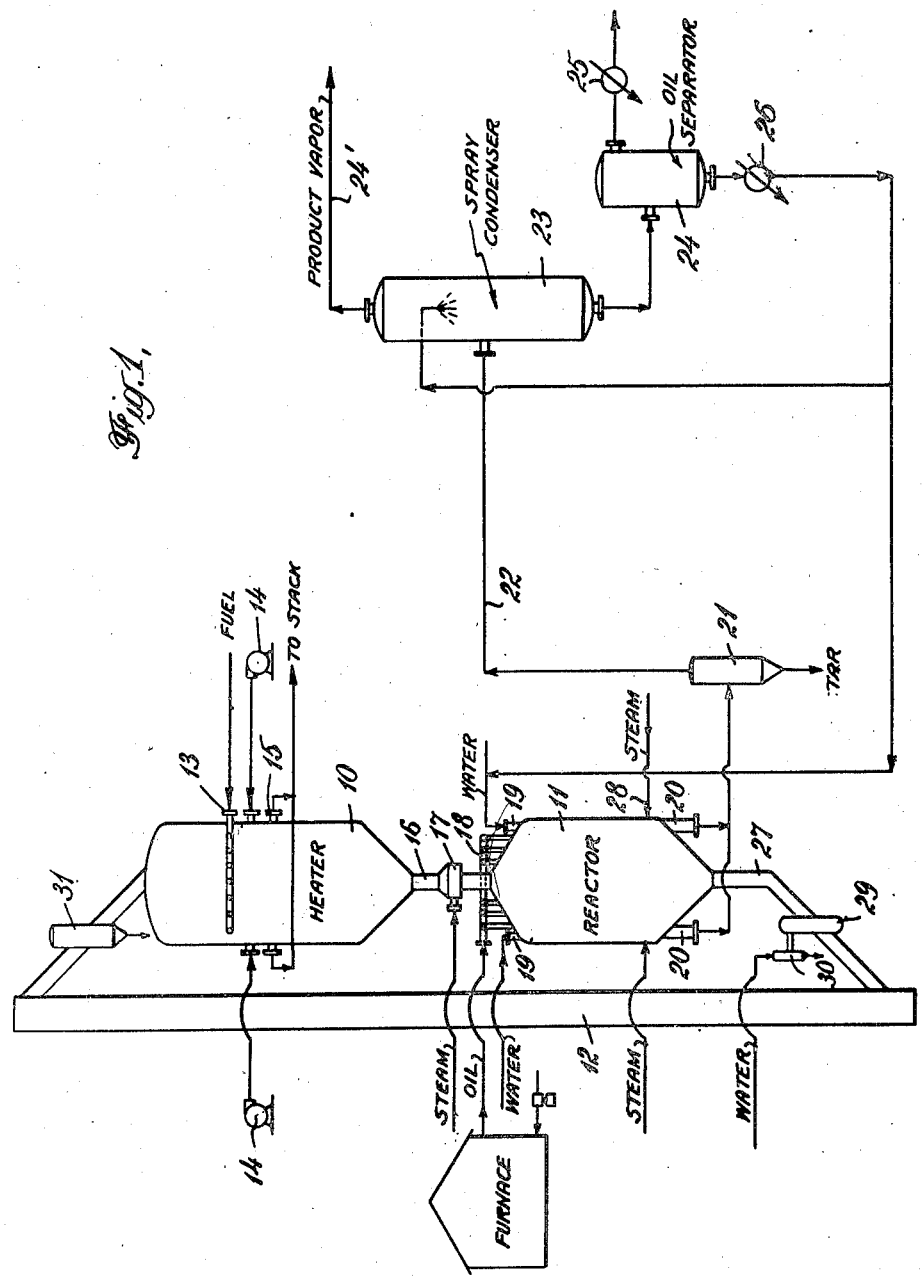

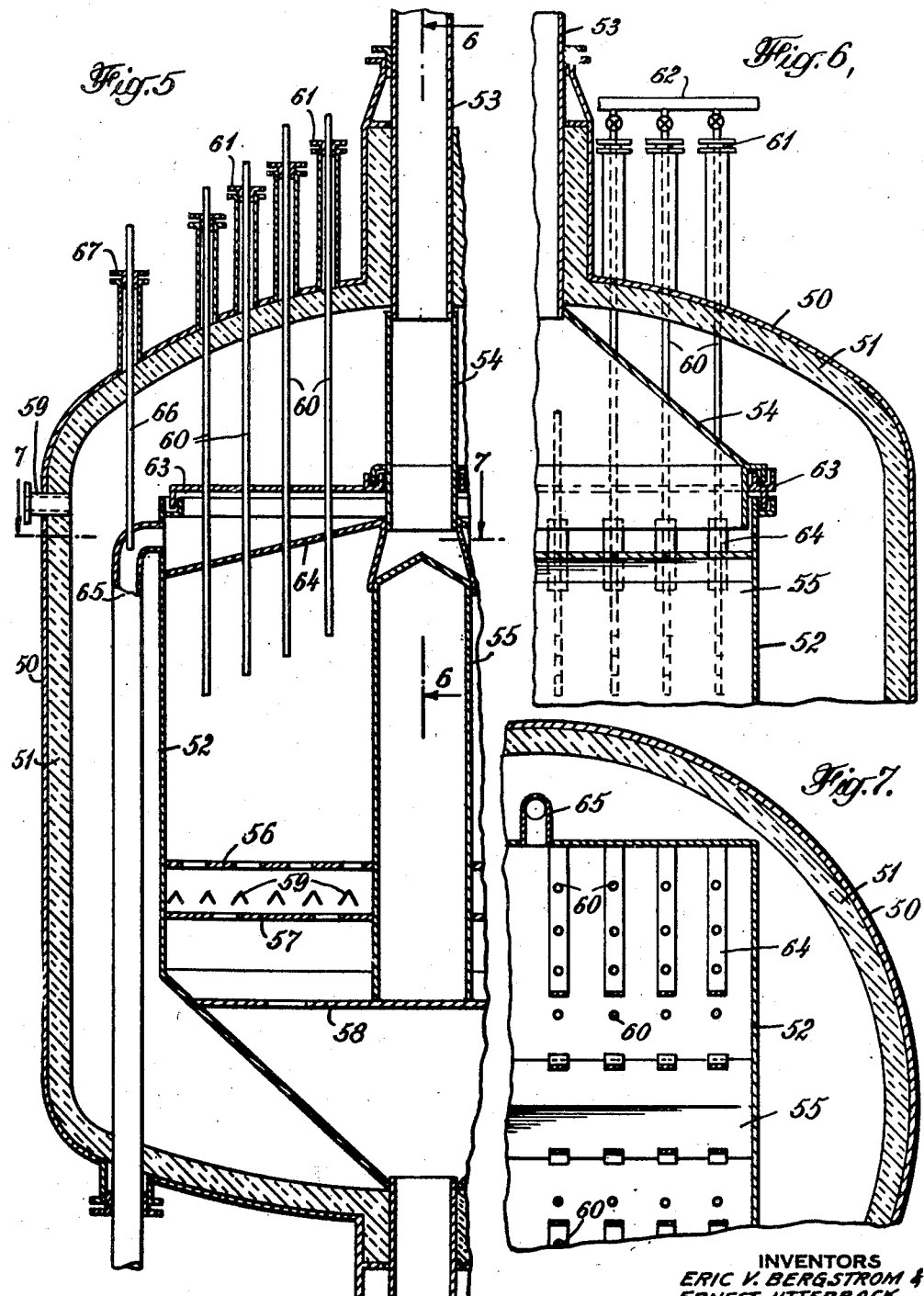

Patented Dec. 16, 1947

2,432,503

UNITED STATES PATENT OFFICE 2,432,503

HEATER

Eric V. Bergstrom, Short Hills, N. J., and Ernest Utterback, New York, N. Y., assignors to Socony-Vacuum Oil Company, Incorporated, a corporation of New York Application March 27, 1946, Serial No. 657,590

3 Claims. (Cl. 263—19)

This invention relates to apparatus for rapidly heating granular solids to an elevated temperature.

Many high temperature reactions can be carried out with great advantage by contacting the reactants with highly heated refractory solid granules. Typical of such reactions is the thermal cracking of hydrocarbon oils such as gas oil and crude oil to give high yields of ethylene. The reaction proceeds very satisfactorily at temperatures on the order of 1500° F. but the reaction is very rapid and at such temperatures secondary condensation reactions rapidly set in to produce highly condensed ring hydrocarbons which plug up apparatus and seriously reduce the yield of the desired product. These disadvantages are overcome to a large extent by introducing the charge to a body of highly heated refractory granules for a suitably short contact time and then rapidly quenching the reaction mixture to temperatures on the order of 900° F. or lower. By this means any heavy secondary products are laid down on the refractory granules and may be rapidly removed by burning. Further, the contact time can be very efficiently controlled.

The present invention provides a highly efficient heater for raising the temperature of refractory granules for use in processes of the type disclosed above. It is a principal object of this invention to provide a heater wherein the flame is propagated within the mass of granules in the heater thus making it unnecessary to provide permanent structural elements in the nature of a fire box adapted to contain extremely high temperature flames. In its preferred embodiment, the invention further provides means for flowing hot products of combustion countercurrently through a moving bed of granules and for using a portion of the heat for preheating granules entering the combustion zone and for preheating air and fuel for the combustion.

These and other objects and advantages of the invention will become apparent from consideration of a typical plant for practicing the invention as illustrated by the annexed drawings wherein:

Figure 1 is a diagrammatic representation of the principal elements of a plant for practicing the thermal cracking of hydrocarbons to produce olefins;

Figure 2 is a vertical half section of a heater for bringing granular refractory solids to the temperature desired for the reaction;

Figure 3 is a partial section on line 3—3 of Figure 2;

Figure 4 is a detail view of a modified type of burner tube for use in the apparatus of Figure 2;

Figure 5 is a partial vertical section of the reactor to which this invention is directed;

Figure 6 is a partial section on line 6—6 of Figure 5; and

Figure 7 is a partial section on line 7—7 of Figure 5.

Referring specifically to Figure 1, a refractory granular solid such as fused aluminum oxide having an average diameter of 0.3 inch is circulated in a cyclic manner through a heater 10, a reactor 11 and an elevator 12. In the heater 10 the granular solid is raised to a suitable temperature by the combustion of fuel introduced at 13 in air from blower 14, flue gases being diverted to an economizer or direct to the stack at 15. The highly heated solids pass downward through a feed leg 16 having a steam sealing zone 17 to the reactor 11. A preheated oil charge which may contain water as described in more detail hereinafter is introduced from a manifold 18 and brought into direct contact with the heated solids in the reactor. The gases rising from contact with the bed of granular solid are quenched with water introduced at 19 and the cooled effluent stream is removed at 20 and passed to a tar separator 21 wherein high boiling materials are removed. The remaining vapor passes from the tar separator by line 22 to a spray condenser 23 wherein oil or water spray further condenses a portion of the effluent stream to leave a vapor containing a high proportion of the desired product which passes overhead by line 24 to suitable purification equipment such as a gas plant. The bottoms from spray condenser 23 are transferred to an oil separator 24 from which is removed a hydrocarbon layer which may be cooled in heat exchanger 25 and a water layer which is passed through cooler 26 and may then be returned to the reactor for quenching or to be mixed with the charge stream. The liquid hydrocarbon layer from oil separator 24 may be further purified to recover gasoline, aromatic naphthas or relatively pure aromatic compounds.

Returning again to the reactor 11, the cooled refractory granules pass down through the reactor to be removed at 27 for recycling to the heater. It is often desirable to seal the bottom of the reactor against escape of hydrocarbons as by introduction of steam at line 28 to the bottom of the reactor. The granules pass through an evacuation pot 29 connected to a water injector 30 and are then transferred to the bottom of the elevator 12 wherein they are raised to the top and returned to the heater through a classifier 31 wherein particles of a size smaller than that desired in the system are removed from the stream and rejected from the system.

The structure of the heater is shown in Figures 2 to 4 wherein the shell 32 encloses means for burning fuel in air in direct contact with the refractory solid and then passing the products of combustion through the refractory solid in generally countercurent relation about the means for introducing air and fuel, thus preheating the solids as well as the air and fuel supplied to the burners.

Granular solids are continuously introduced at the top of the heater 10 to fall on a tube sheet 33 having a plurality of depending feed pipes 34 which provide a substantially uniform supply of solids across the heater above the heating zone. Solids from the feed pipes 34 pass downwardly through preheating pipes 35 to enter a zone of direct contact with products of combustion below the ends of the tubes 35. Air and fuel for heating the solid are introduced by air headers 36 and fuel headers 37 respectively. Depending from the air headers 36 are a plurality of air tubes 38, each enclosing a fuel tube 39 connected to a fuel header 37. As the air and fuel pass downward through their respective supply tubes, they are heated and are then combined at the bottom of the supply tubes to provide a very hot flame impinging directly on the hot granular solids. As will be apparent, there is an open space, free of solids, directly below the end of each air tube 38, the form of which depends on the angle of repose of the granular solid. This forms a small combustion chamber, but for the most part, the flame is propagated through and combustion occurs on the surface of the granular solids thus giving very efficient heating. The products of combustion flow upward through the mass of solids in countercurrent direction thereto until they reach the bottom of preheating pipes 35 and enter a chamber free of solids about the preheating tubes 35 and the air tubes 38.

The highly heated solids are withdrawn from the heater at a uniform rate across the heater by the use of flow controlling plates shown in the bottom of Figure 2. The upper plate 40 has a number of depending feed pipes 41 each of which draws uniformly from a small area above its open upper end. The solids from the pipes 41 are withdrawn from a space between plate 40 and a plate 42 therebelow by a lesser number of openings in the plate 42. Similarly, a still lower plate 44 has a number of openings still less than the number of openings in plate 45.

The general arrangement of tubes in the heating and combustion portion of heater 10 is illustrated in Figure 3 wherein it is shown how the tubes for supplying air and fuel are uniformly dispersed among the tubes for supplying hot granular solids. Figure 4 is a detail view which shows a modified type of tube for supplying air and fuel. The air tube 38 is of the same general nature as those shown in Figure 2 but the fuel is introduced at a plurality of spaced points near the bottom of the burning section by means of perforated pipes 46 extending out from the fuel tube 39 as shown. Preferably, a triangular fin 47 is provided above each of the perforated tubes 46 as shown. Other modifications of the specific structure shown which accomplish the same result of propagating a flame within the mass of solid particles will be immediately apparent to those skilled in the art. For example, the fuel feed pipe may extend down into the mass of solids below the end of the air tube with fuel supplied by an open end of the fuel pipe, perforations or the like.

Figures 5 to 7 inclusive relate to the reactor structure which is characterized by means to so introduce the hot refractory granules that they will have an upper surface of relatively simple configuration thus rendering easier the problem of controlling reaction time. The outer shell 50 of reactor 11, having internal insulation 51, is of generally circular outline. The actual reactor space, however, is defined by an inner shell 52 of generally rectangular cross-section. The hot solids are introduced to reactor 11 from feed pipe 53 to a hood 54 above a dividing insert 55. Because the reactor is operated substantially full at all times, the hot granular solid will be distributed along the length of divider 55, the slope of the upper portion of the hood 54 along its greater length (see Figure 6) being greater than the angle of repose of the solids. The solids therefore flow out the bottom of hood 54 equally along the length thereof and having an upper surface of the moving bed extending as a plane sloping at the angle of repose from the bottom edge or hood 54 to the opposite side of shell 52.

The compact moving bed of solids within shell 52 moves steadily downward to flow control plates 56, 57 and 58 which are similar in function to flow control plates 40, 42 and 44 of the heater. Sealing steam is advantageously introduced by a plurality of inverted angles 59 which may be placed between flow control plates 56 and 57. It is found desirable to prevent condensible hydrocarbons from leaking out of the shell 52 and condensing between outer shell 50 and internal insulation 51. This is advantageously accomplished by introducing a noncondensible gas at 59. The gas introduced at 59 may be the light hydrocarbon gases available around oil refineries or may be the light hydrocarbon gases removed from the product of the reaction.

The charge is introduced to the upper portion of the moving bed within inner shell 52 by the plurality of pipes 60 extending into the reactor through stuffing boxes 61 from headers 62. Normally, reactions of the present type proceed more satisfactorily in the presence of steam and the steam for the reaction may be provided by water which is vaporized in the reactor with the charge. The water may be emulsified with the charge to the reactor or a mixture of water and oil charge from header 62 may be passed through a homogenizing valve before introduction to the reactor. The pipes 60 extend through a plate 63 which forms the top of the reaction zone and through strips 64 extending from the edge of hood 54 to the inner shell 52. The space between the strips 64 and the top plate 63 form a discharge collecting zone from which the treated vapors are withdrawn by pipe 65 to be conducted to separating and purifying apparatus as described above. The temperature of the effluent gases is advantageously reduced upon entry into discharge pipe 65 by spraying water therein from a pipe 66 entering the reactor through stuffing box 67.

In a typical operation a mass of aluminum oxide refractory pellets of about 0.3 inch diameter is handled in the elevator at 900° F. at the rate of 200 tons per hour. In the heater the temperature of the pellets is raised from 900° F. to 1575° F. and the pellets enter the reactor at 1546°

F. 31,150 lbs. per hour of oil at 900° F. and 15,700 lbs. per hour of water are introduced to the heated granular refractory. At a contact time of 0.29 second with a mean effective temperature of 1440° F. a product is produced which is quenched immediately with water to 572° F. After removal of tars, the remaining vapor is quenched to 100° F.

Among the products produced are 8,752 lbs. per hour of ethylene representing a yield of 28.1% by weight of this principal product. The process also produces 1500 lbs. per hour of highly aromatic gasoline having a clear octane number of 90 or better. Substantial yields of propylene and butadiene are also obtained.

It will be noted that the reaction zone is such that the process is not adversely effected by accumulation of coky or tarry deposits or by deposition of solid matter itself from impurities in the charging stock. Similarly, dirty water may be used since all solid deposits from the reaction are laid down on solid particles which are thereafter transferred to a combustion zone wherein solid contaminants are rapidly and efficiently removed by burning.

The apparatus is also adapted to production of acetylene at 2400° F. by cracking of propane or the like. It is found desirable in this case to introduce the hydrocarbon charge to a fairly low point in the reactor, say a short distance above the upper flow control plate and introduce water or steam in a uniform manner near the top of the reactor.

We claim:

1. In a heater for granular solids, a vertical shell, means at the upper end of said shell for introducing granular solids to the interior of said shell, means at the lower end of said shell for removing granular solids from the interior thereof, a plurality of vertical air tubes in said shell, means to introduce air to the upper portion of each of said tubes, a fuel pipe in each of said air tubes, terminating near the bottom of said air tubes, means to supply fuel to each of said fuel pipes, a plurality of feed tubes open at both ends having the lower open ends thereof spaced upwardly in said shell from the lower ends of said air tubes, means to direct granular solids moving downwardly within said shell through said feed tubes and an outlet for gaseous products of combustion from said shell intermediate the ends of said feed tubes.

2. In a heater for granular solids, a vertical shell, means at the upper end of said shell for introducing granular solids to the interior of said shell, means at the lower end of said shell for removing granular solids from the interior thereof, a plurality of vertical air tubes in said shell, means to introduce air to the upper portion of each of said tubes, means to supply fuel to the interior of said shell adjacent the lower ends of said air tubes, a plurality of feed tubes open at both ends having the lower open ends thereof spaced upwardly in said shell from the lower ends of said air tubes, means to direct granular solids moving downwardly within said shell through said feed tubes and an outlet for gaseous products of combustion from said shell intermediate the ends of said feed tubes.

3. In a heater for granular solids, a vertical shell, means at the upper end of said shell for introducing granular solids to the interior of said shell, means at the lower end of said shell for removing granular solids from the interior thereof, a plurality of vertical air tubes in said shell, means to introduce air to the upper portion of each of said tubes, a fuel pipe in each of said air tubes, terminating near the bottom of said air tubes, means to supply fuel to each of said fuel pipes, a plurality of fuel outlets extending from the lower portion of each of said fuel pipes through the air tube thereabout, a plurality of feed tubes open at both ends having the lower open ends thereof spaced upwardly in said shell from the lower ends of said air tubes, means to direct granular solids moving downwardly within said shell through said feed tubes and an outlet for gaseous products of combustion from said shell intermediate the ends of said feed tubes.

ERIC V. BERGSTROM.
ERNEST UTTERBACK.